Aug. 21, 1962 K. H. POWERS 3,050,700

PHASE SHIFTING CIRCUIT

Filed Jan. 19, 1959 3 Sheets-Sheet 1

INVENTOR.
KERNS H. POWERS
BY
Charles H. Brown
ATTORNEY

Aug. 21, 1962 K. H. POWERS 3,050,700

PHASE SHIFTING CIRCUIT

Filed Jan. 19, 1959 3 Sheets-Sheet 2

INVENTOR.
KERNS H. POWERS
BY
Charles H. Brown
ATTORNEY

PHASE SHIFTING CIRCUIT

Filed Jan. 19, 1959 3 Sheets-Sheet 3

INVENTOR.
KERNS H. POWERS
BY
Charles H. Brown
ATTORNEY

3,050,700
PHASE SHIFTING CIRCUIT

Kerns H. Powers, Trenton, N.J., assignor to Radio Corporation of America, a corporation of Delaware Filed Jan. 19, 1959, Ser. No. 787,479
1 Claim. (Cl. 333—29)

This invention relates to a phase shifter and is a continuation-in-part of my copending application Serial No. 731,304 filed April 28, 1958 for Amplitude Modulation System, now Patent No. 2,987,683, issued June 6, 1961.

In my copending application, supra, a transmitter is provided having an important advantage as compared to conventional amplitude modulation (AM) transmitters. By utilizing techniques of simultaneous amplitude modulation (AM) and phase modulation (PM), a signal is produced occupying approximately half the spectrum space required by conventional AM. A feature of the invention is the fact that the signal so produced can be detected by a conventional envelope detector of the type presently used in AM receivers.

The reduction of bandwidth is becoming increasingly important at the present time due to the crowded condition of the radio spectrum. In order to conserve frequency spectrum, it has been proposed to utilize single sideband (SSB) transmission. The signals generated by SSB transmitters are, however, not compatible in the sense previously discussed, since such signals must be detected by special, complicated and expensive receivers employing synchronous detection or demodulation with a carrier generated locally in the receiver. The process of maintaining the frequency of this locally-generated carrier with sufficient accuracy presents a problem in receiver design. A transmitter is provided having the advantage of reduced bandwith as in SSB transmitters and also the advantage of compatibility with existing AM equipment which the SSB transmitters do not possess. A wide-band 90-degree phase-splitting network is provided by the present invention suitable for use in the transmitter described in my above-mentioned copending application or in any application where preservation of the exact input waveform is important to convey the intelligence.

An object of the invention is to provide a novel wide-band 90-degree phase-shifting network for producing an output signal whose Fourier components differ from the delayed input signal by 90° throughout the frequency band of the input signal.

Another object is to provide a novel wide-band 90-degree phase-splitting network for producing a 90-degree phase difference between an output signal of the network and the delayed replica of the input signal to the network without phase distortion and without the use of modulation techniques.

A signal whose instantaneous envelope varies with the intelligence desired to be conveyed can be generated having components on only one side of the carrier frequency by utilizing techniques of simultaneous AM and PM, if certain relationships between the envelope and phase are maintained. The envelope must, however, satisfy certain requirements. The first requirement is that the envelope be non-negative, since an envelope, by its very definition, is a non-negative function. A second requirement, in addition to non-negativeness, is that the envelope be such that its logarithm is of the class of functions for which a harmonic conjugate, or phase-quadrature signal exists. It suffices to state here that any physical signal can be made to satisfy these conditions as closely as desired.

In the transmitter described in my copending application, supra, the input signal representing the intelligence to be conveyed (e.g. voice, video or other form of modulation) is first converted into a non-negative signal or envelope. The envelope is then passed through a non-linear device with transfer characteristic $y=\log x$ to form the logarithm of the envelope. The logarithm of the envelope is applied to a wide-band 90-degree phase-shifting network of the present invention which produces an output signal in phase-quadrature with the logarithm of a delayed replica of the envelope. The output signal from the phase-shifting network modulates a carrier of given frequency in a phase modulator.

Simultaneously with the above action, the envelope is delayed by a duration equal to the delay of the phase-shifter. The delayed envelope then amplitude modulates the carrier which has been phase-modulated by the output signal of the phase-shifting network. The resulting signal contains energy distributed on one side of the carrier only. Upper or lower sideband operation can be selected by inverting the output signal of the phase-shifting network. The bandwidth required is, however, twice the modulating frequency, as in conventional AM. The signal can then be passed through a suitable filter to reduce the spectral width to a value equal to the top modulating frequency. Under single-tone modulation, the filter has no effect for modulating frequencies less than half the top modulating frequency and leaves the envelope undistorted.

In a further embodiment, the use of a filter to derive the final output signal is eliminated by conveying the desired intelligence in the square of the envelope rather than in the envelope itself. The spectral width of the resulting modulated signal is exactly equal to the bandwidth of the intelligence providing a system with channel utilization efficiency equal to that of conventional SSB systems. Distortionless detection is accomplished by means of a square-law envelope detector at the receiver thereby removing the need for precise frequency control at the receiver required by synchronous detection methods in conventional SSB systems.

The objects of the present invention are accomplished by a phase-splitting network constructed in the form of a delay line such that an input signal is split into two components whose Fourier constituents are of equal amplitude but differ in phase by 90 degrees throughout the frequency band of the input signal. A network is provided for use in a wide range of applications where it is required or desired to produce a 90-degree phase difference without phase distortion and without the use of modulation techniques.

A transmitter is provided including the phase shifting network of the present invention in which the intelligence is conveyed in the envelope of a hybrid amplitude and phase modulated wave. The signal may be detected by a conventional AM receiver in a known manner, permitting the conversion of a conventional AM system to a compatible SSB system by a modification of the transmitter alone in one embodiment and by a modification of the transmitter along with a slight modification of the receiver in a second embodiment. The transmitter is readily adaptable for use in voice, video or other known communication systems.

A detailed description of the invention will now be given in connection with the accompanying drawing in which.

Figure 1:
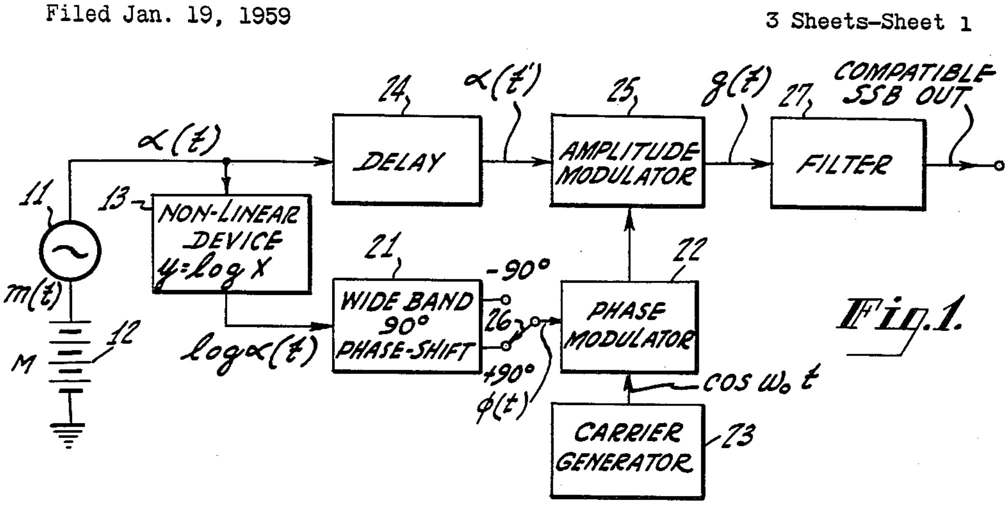
FIGURE 1 is a block diagram of a transmitter constructed according to one embodiment of the invention.
Figure 2:
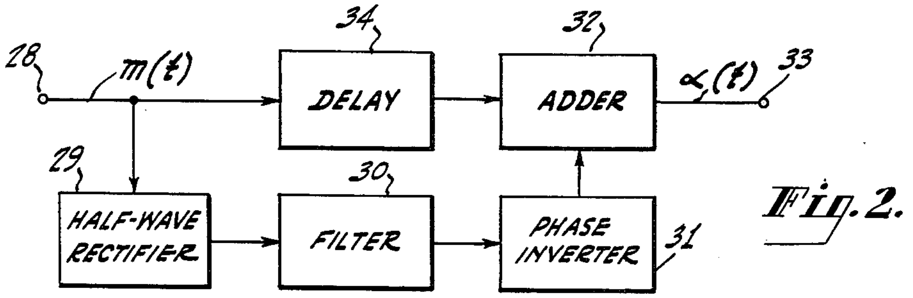
FIGURE 2 is a block diagram of an arrangement for deriving a non-negative signal or envelope from a voice input signal and is of interest in connection with the description of the embodiment given in FIGURE 1.
Figure 3:
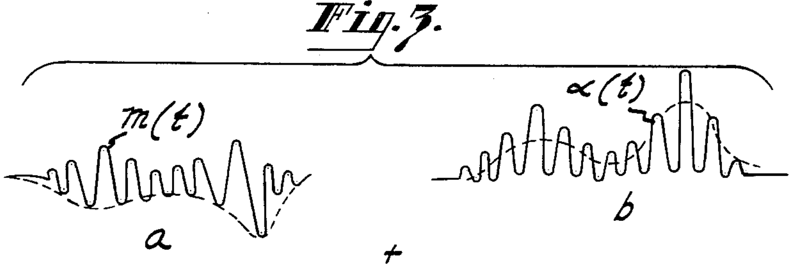
Figure 4:
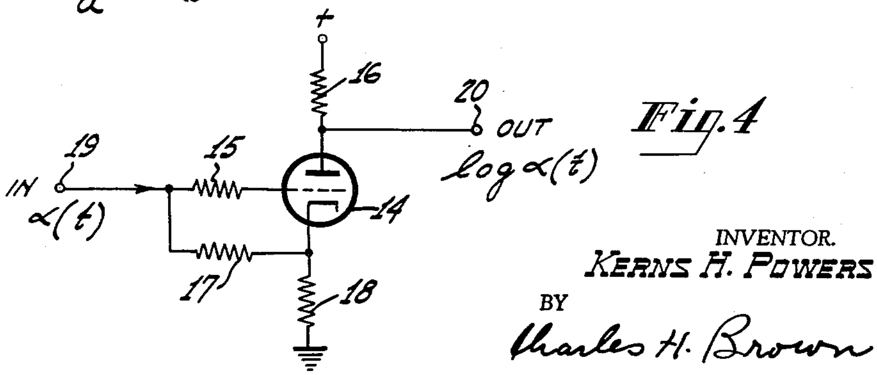
Figure 5:
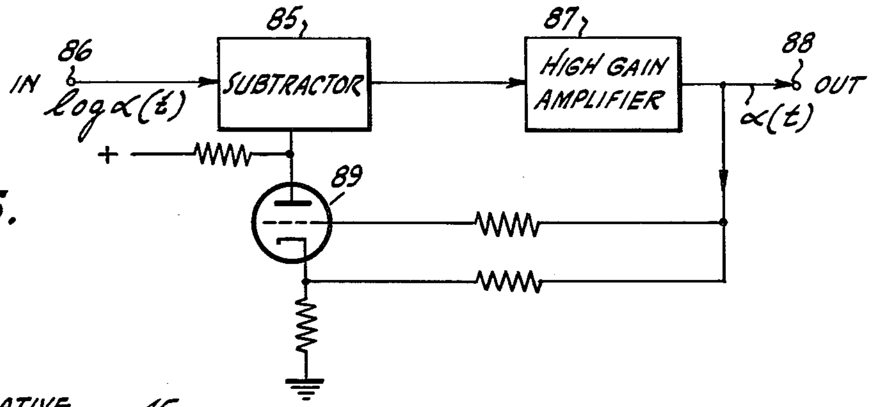
Figure 6:
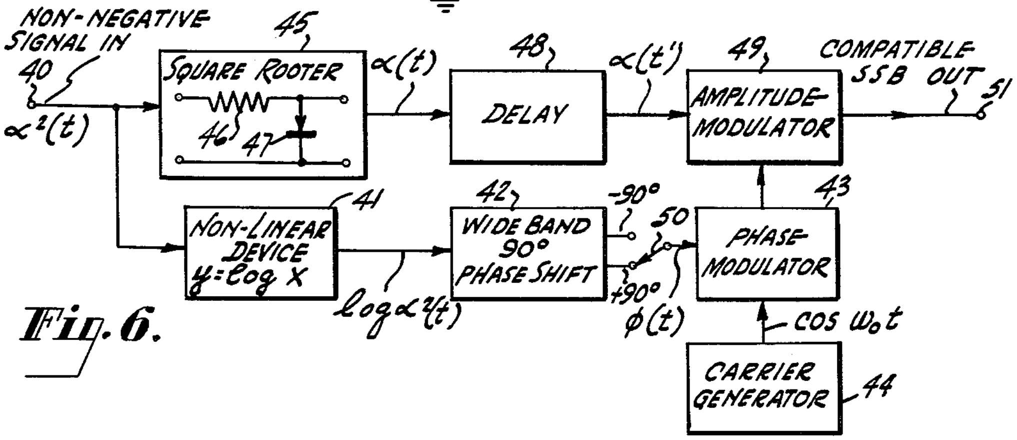
Figure 7:
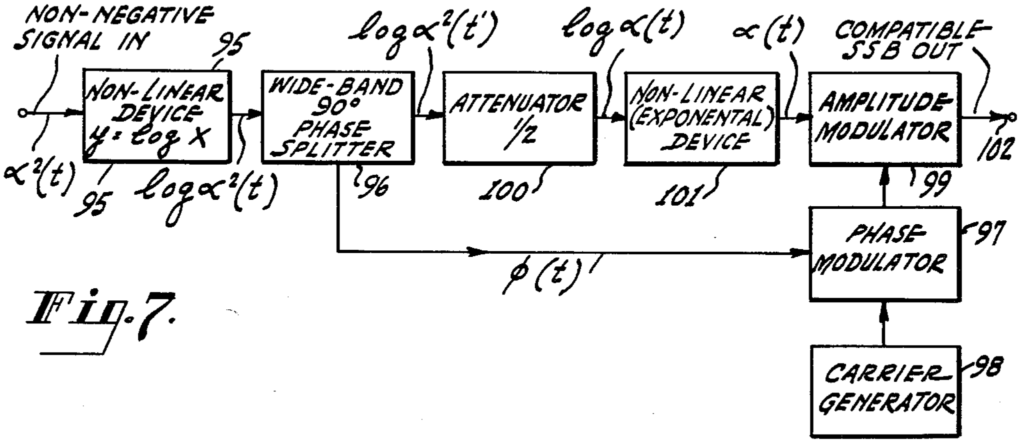
Figure 8:
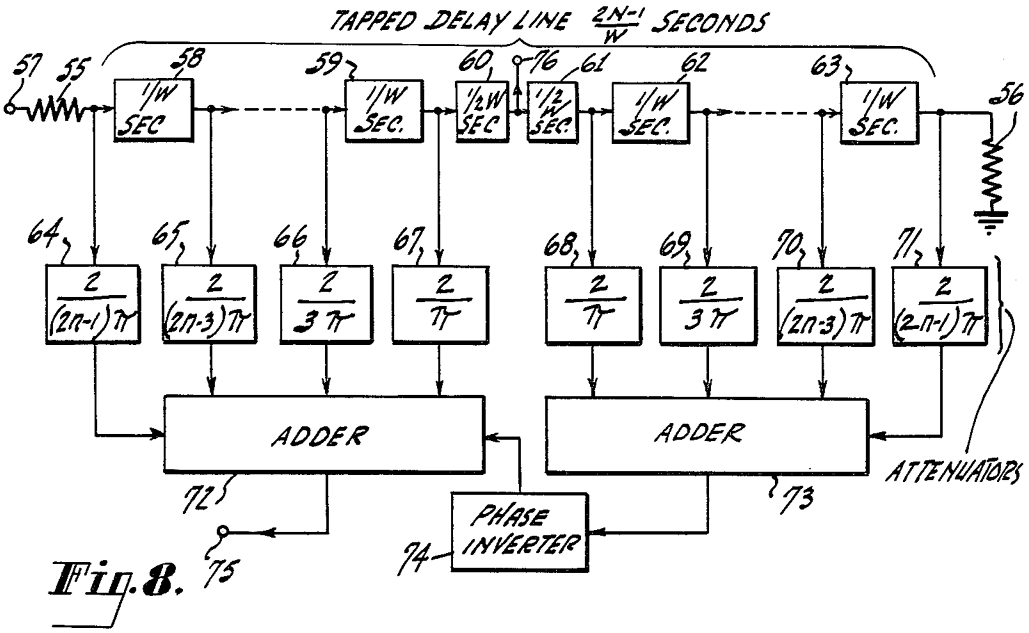
Figures 9, 10:
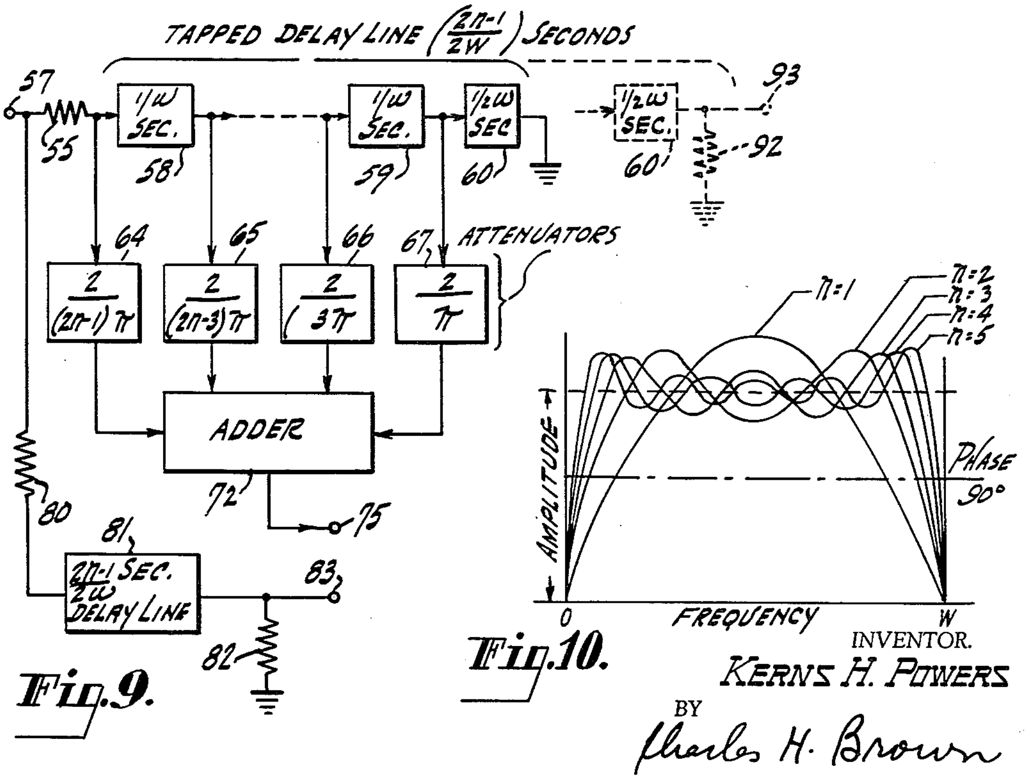

FIGURE 3, *a* and *b*, shows curves useful in describing the arrangement given in FIGURE 2;

FIGURE 4 is a circuit diagram of a non-linear, logarithmic device and is of interest in connection with the description of the arrangement given in FIGURE 1;

FIGURE 5 is a diagram of a non-linear, exponential device and is of interest in connection with the description of the arrangements given in FIGURES 1 and 7;

FIGURE 6 is a block diagram of a transmitter constructed according to a further embodiment of the invention;

FIGURE 7 is a block diagram of a modified form of the embodiment of the invention given in FIGURE 6;

FIGURE 8 is a detailed diagram of a wide-band 90-degree phase-splitting network constructed according to the invention;

FIGURE 9 is a detailed diagram of a further embodiment of a wide-band 90-degree phase-splitting network constructed according to the invention; and FIGURE 10 is a series of curve useful in describing the operation of the phase-splitting network given in FIGURE 8.

A hybrid amplitude and phase modulated wave may be expressed in the form:

$$\alpha(t)\ \cos\ [\omega_0 t+\phi(t)] \qquad (1)$$

where $t$ is time. This is equivalent to simultaneous amplitude modulation (AM) by $\alpha(t)$ and phase modulation (PM) of the carrier signal cos $\omega_0(t)$ by $\phi(t)$. If such a wave is properly generated and then transmitted, the intelligence can be conveyed either by the instaneous phase $\phi(t)$ or by its derivative, the instantaneous frequency $\phi'(t)$, or by the instantaneous envelope $\alpha(t)$. The intelligence can then be recovered at the receiver by limiter-discriminator techniques, as employed in conventional frequency modulation and phase modulation receivers, in the case of the phase $\phi(t)$ and the frequency $\phi'(t)$, or by envelope detection of the amplitude $\alpha$(t). The present invention relates to the second of these two concepts or the conveying of the intelligence by the instantaneous envelope $\alpha(t)$.

When a hybrid amplitude- and phase-modulated wave of the type discussed is intended to have spectral components lying on only one side of the carrier, certain relationships between the envelope $\alpha(t)$ and the phase $\phi(t)$ must be maintained. However, for a given envelope, the required phase is not unique, there being an infinite number of phase variations possible in the signal with unilateral spectrum. Only one of these phases, the so-called minimum phase, gives the minimum possible bandwidth on one side of the carrier. It can be proven mathematically that the envelope and the minimum-phase function are uniquely related, and in particular that the minimum-phase function must be in phase-quadrature with the logarithm of the envelope.

FIGURE 1 is a block diagram of a transmitter for generating a hybrid amplitude and phase modulated wave having components lying on only one side of the carrier and whose instantaneous envelope is $\alpha(t)$. In order to generate a signal whose envelope conveys the intelligence, attention must be given to the envelope requirements for physical realizability as well as to the non-uniqueness of the phase function. Since an envelope is by its very definition a non-negative function, means must be provided for obtaining a non-negative intelligence function before any operations are performed to derive the phase function. A source 11 of voice, video or other modulating signal is provided. One simple method of converting the signal supplied by source 11 to a non-negative signal is to add a constant voltage by a battery 12 or other source of constant positive potential to the signal equal in value M to the largest negative peak. The intelligence signal $m(t)$ is assumed to be bounded from below by —M. That is, $m(t)+M\geqslant 0$ for all time. By adding the constant voltage M, a non-negative signal $\alpha(t)$ is produced which is the envelope of the final output signal to be generated.

The envelope $\alpha(t)$ is fed over a first path including a non-linear device 13 with transfer characteristic $y=\log x$, where $y$ is the output response for an input $x$, to derive the logarithm of the envelope $\alpha(t)$ or the signal log $\alpha(t)$. An example of a conventional circuit suitable for use as the non-linear device 13 is given in FIGURE 4. A triode tube 14 is shown which is always conducting and drawing current through resistor 15 by the arrangement of resistors 15, 16, 17 and 18. As the non-negative signal or envelope $\alpha(t)$ is applied to the tube 14 via input terminal 19, tube 14 conducts more heavily. An increase in grid current occurs, resulting in an increased voltage drop across resistor 15. As a result of this action, the voltage at the grid of tube 14 increases by a smaller amount than the increase in the envelope or incoming non-negative signal $\alpha(t)$. In the region of grid current, the plate current bears logarithmic relationship to the grid current. Since the grid current is a direct function of the envelope $\alpha(t)$, the plate current is a direct function of the logarithm of the envelope $\alpha(t)$, and the signal log $\alpha(t)$ appears at the output terminal 20.

The signal log $\alpha(t)$ is applied to the input of a wide-band 90-degree phase-shift network 21. This network 21 which may be of the type shown in FIGURES 8 and 9 to be described produces an output signal $\phi(t)$ which is in quadrature with a delayed replica of the signal log $\alpha(t)$. That is, the network 21 produces the harmonic conjugate of the signal log $\alpha(t)$, the minimum phase function $\phi(t)$. The signal $\phi(t)$ is then applied to a conventional phase modulator 22 to phase modulate a carrier signal supplied by a carrier generator 23.

Simultaneously with the above action, the envelope $\alpha(t)$ is applied to a delay circuit 24. The delay circuit 24 which may be, for example, a distributed-parameter delay line or a conventional inductance-capacitance delay network is set to delay the envelope $\alpha(t)$ by a duration equal to the delay of the phase-shift network 21 and produces a signal $\alpha(t')$. The signal $\alpha(t')$ is fed to a conventional amplitude modulator 25 to which the carrier phase modulated by the signal $\phi(t)$ is also applied from the phase modulator 22. The amplitude modulator 25 may be operated as a direct-coupled modulator if the signal processor of FIGURE 2 to be described later is used, or as an alternating current coupled modulator if the battery 12 of FIGURE 1 is used. An alternative arrangement may comprise a simultaneous grid-plate modulation as is employed in conventional controlled-carrier AM transmitters. The operation of the amplitude modulator 25 produces a signal which contains energy distributed on one side of the carrier only. Upper or lower sideband operation can be selected by the operation of a switch 26 in the output of the phase-shift network 21. The switch 26 represents any phase inverting device such that in the lower condition or +90° position of the switch 26 the signal $\phi(t)$ leads the signal log $\alpha(t')$ by 90 degrees. In the upper condition or —90°, the signal $\phi(t)$ lags the signal log $\alpha(t')$ by 90 degrees. In the lower condition of switch 26, the energy is distributed below the carrier, while in the upper condition of switch 26 the energy is distributed above the carrier, and so on.

By way of example, it will be assumed that single tone modulation is used. Let the envelope be considered sinusoidal and set $$\alpha(t)=1+a^2+2a\cos\theta t \qquad (2)$$

where $a$ is related to the percentage modulation $$m \text{ by } m=2a/(1+a^2)$$

Now $$\log\alpha(t)=\log\ (1+a^2+2a\cos\theta t)=2\sum_{k=1}^{\infty}(-1)^k\frac{a^k}{k}\cos k\theta t \qquad (3)$$

where we have used the Fourier series expansion. The signal in quadrature is then $$\phi(t)=2\sum_{k=1}^{\infty}(-1)^k\frac{a^k}{k}\sin k\theta t=-2\tan^{-1}\frac{a\sin\theta t}{1+a\cos\theta t} \quad (4)$$

A simple computation gives for the hybrid wave $$g(t)=\alpha(t)\cos[\omega_0 t+\phi(t)]=\cos\omega_0 t +2a\cos(\omega_0+\theta)t+a^2\cos(\omega_0+2\theta)t \quad (5)$$

which contains components at and above the carrier only. Normalized with respect to the direct current (D.C.) component of the envelope $\omega(t)$ and expressed in terms of $m$, $$g(t)=\frac{m^2}{2(1-\sqrt{1-m^2})}\cos\omega_0 t +m\cos(\omega_0+\theta)t\frac{+1-\sqrt{1-m^2}}{2}\cos(\omega_0+2\theta)t \quad (6)$$

Under conditions of one hundred percent modulation ($m=1$), for example, the effect of the hybrid modulation is to simply shift the carrier of conventional AM up by an amount equal to the modulating frequency.

The bandwidth of the signal $g(t)$ at the output of the amplitude modulator 25 is twice the modulating frequency, as in conventional AM. The signal $g(t)$ is passed through a conventional filter 27 of suitable construction which is set to reduce the spectral width to a value equal to the top modulating frequency and leaves the envelope within the filtered band undistorted. For frequencies above half the top modulating frequency, the filter 27 inserts harmonic distortion into the envelope. However, this distortion is outside the band of interest and can be removed, if disturbing, at the post-detection point of the receiver. A compatible SSB AM system is thus provided by the invention in which the desired intelligence is conveyed in the envelope of a hybrid amplitude and phase modulated wave. The generated signal may be detected by any ordinary AM receiver that employs envelope detection. The invention, therefore, possesses both the advantage of reduced bandwidth and the advantage of compatibility with existing AM equipment by a modification of the transmitter alone.

While one method of deriving a non-negative signal is given in FIGURE 1, a more economical method from the standpoint of power in the case of voice operation is shown in FIGURE 2. The voice signal $m(t)$ depicted in FIGURE 3*a* supplied by any suitable source is applied to input terminal 28. The signal $m(t)$ is rectified in a half-wave rectifier 29 and passed through a filter 30 to retrieve the negative-going slowly-varying envelope of the voice signal, the negative-going envelope being indicated by the dotted line of the curve given in FIGURE 3*a*. This envelope is inverted by a phase inverter 31 and fed to an adder 32. The signal $m(t)$ is fed through delay circuit 34 where it is delayed by a duration equal to the delay over the path including the rectifier 29, filter 30 and phase inverter 31, the delayed signal $m(t)$ being fed to the adder 32. By this action, a non-negative signal or envelope $\alpha(t)$, as shown in FIGURE 3*b*, appears at the output of the adder 32 and may be applied via output terminal 33 as in FIGURE 1. An advantage of this method is that in the absence of an input signal $m(t)$, $\alpha(t)$ is zero, and no power is transmitted, effecting an economy from the standpoint of power.

In the embodiment of FIGURE 1, it was pointed out that the spectral width of the modulated signal is, in general, twice the bandwidth of the envelope. The envelope occurs in the spectrum in close proximity to one side of the carrier, and a filter 27 can be used to filter the signal $g(t)$ to occupy a spectral width equal to that of the envelope. However, such filtering results in a certain amount of intermodulation distortion which may render the embodiment of FIGURE 1 unsuitable for use in certain applications. A further embodiment of the invention eliminating the need for such filtering is given in FIGURE 6. FIGURE 6 discloses an arrangement by which the intelligence is conveyed in the square of the envelope rather than in the envelope itself. By this action, the spectral width of the modulated signal is exactly equal to the bandwidth of the intelligence. With the exception of the addition of a square rooter, the embodiment of the invention shown in FIGURE 6 is similar in operation to the embodiment given in FIGURE 1.

An intelligence signal $m(t)$ is converted into a non-negative signal by any suitable method as, for example, one of the methods referred to above. The non-negative signal $\alpha^2(t)$ is applied to an input terminal 40. The non-negative signal is referred to as $\alpha^2(t)$, since it is the square of the signal that is to be the envelope of the hybrid modulated wave. The signal $\alpha^2(t)$ is fed through a non-linear device 41 such as is shown in FIGURE 3 that produces a signal, $\log\alpha^2(t)$, proportional to the logarithm of its input. In practice, the input to the non-linear device 41 can be either $\alpha(t)$ or $\alpha^2(t)$, since $\log\alpha^2(t)$ is simply twice $\log\alpha(t)$. The signal $\log\alpha^2(t)$ is then fed through a wide-band 90-degree phase shift network 42 which may be constructed in the manner shown in FIGURE 8 or 9 to be described. The network 42 provides a signal $\phi(t)$ whose Fourier constituents are 90 degrees out of phase with those of the signal $\log\alpha^2(t)$. Thus, $\phi(t)$ is in quadrature with $\log\alpha^2(t)$. The signal $\phi(t)$ (minimum-phase function) is used to phase modulate in a phase modulator 43 the carrier $\cos\omega_0 t$ supplied by a carrier generator 44, producing the signal $\cos\omega t+\phi(t)$.

Simultaneously with the above action, the signal $\alpha^2(t)$ is applied to a square rooter 45. The square rooter may be any known device for producing at its output a signal that is the square root of the signal at its input. An example of such a device is given in FIGURE 6, comprising a resistor 46 and a diode 47 through which current flows in the direction of the arrow. The diode 47, operating in the square law region, is always conducting, the current through the diode 47 being proportional to the square of the voltage across the diode 47. The resistor 46 is set to be a large resistance compared to the forward impedance of the diode 47 so that the current flowing through diode 47 is directly proportional to input signal $\alpha^2(t)$. The output of the square rooter is the voltage across the diode 47 which is equal to the square root of the current through the diode 47. The output is a signal $\alpha(t)$, the envelope desired.

The signal $\alpha(t)$ is fed through a delay line 48 which may be the same as the delay line 24 of FIGURE 1 and is delayed by a duration equal to the delay experienced in the phase-shift network 42. The delayed signal $\alpha(t')$ is fed to an amplitude modulator 49 to which the signal $\cos[\omega t+\phi(t)]$ is also fed from the phase modulator 43. The signal $\cos[\omega t+\phi(t)]$ is amplitude modulated by the signal $\alpha(t')$, and a hybrid signal $$\alpha(t)\cos[\omega t+\phi(t)]$$

is produced which is a single sideband signal containing the intelligence to be conveyed in the square of the envelope.

An output signal is produced at output terminal 51 having a spectral width exactly equal to the bandwidth of the intelligence, and no filtering or similar operation is required. By the operation of the switch 50 corresponding to any suitable phase inverting device in the output of the phase-shift network 42, the upper or lower sideband can be selected. A phase advance of 90 degrees, +90°, produces a lower sideband signal, while retarding the phase by 90 degrees, −90°, produces an upper sideband signal.

That the embodiment of the invention given in FIGURE 6 does produce a single sideband signal with spectral width equal to the intelligence bandwidth may be shown by the following mathematical proof.

Let the intelligence signal $\alpha^2(t)$ be periodic with fundamental angular frequency $\mu$, and containing no frequency components above $N\mu$, where N is an integer. Thus, $\alpha^2(t)$ admits of a Fourier series expansion:

$$\alpha^2(t)=\sum_{k=-N}^{N}\alpha_k e^{ik\mu t} \qquad (7)$$

Assume that the direct current component $\alpha_0$ is sufficiently high that $\alpha^2(t)>0$ for all $t$. The function $\log \alpha^2(t)$ is also periodic (but not necessarily bandlimited) and can be written, $$\log \alpha^2(t)=\sum_{k=-\infty}^{\infty}\beta_k e^{ik\mu t}=a_0+2\sum_{k=1}^{\infty}(a_k \cos k\mu t+b_k \sin k\mu t) \qquad (8)$$

The function $\log \alpha(t)$ becomes $$\log \alpha(t)=\frac{a_0}{2}+\sum_{k=1}^{\infty}(a_k \cos k\mu t+b_k \sin k\mu t) \qquad (9)$$

Now if all Fourier constituents of $\log \alpha(t)$ are retarded by 90° to form $\phi(t)$, we have $$\phi(t)=\sum_{k=1}^{\infty}(a_k \sin k\mu t-b_k \cos k\mu t) \qquad (10)$$

Since the phase-shift network 42 has zero response to direct current, the constant term vanishes.

Now if $\omega$ is a carrier frequency, the hybrid amplitude and phase modulated wave can be written $$\alpha(t) \cos [\omega t+\phi(t)]=Re\,\alpha(t)e^{i\phi(t)}e^{i\omega t} \qquad (11)$$

where R*e* signifies "the real part of."

Let us consider the complex function $$\begin{aligned}\lambda(t)&=\alpha(t)e^{i\phi(t)}\\ &=\exp[\log \alpha(t)+i\phi(t)]\\ &=\exp\left\{\frac{a_0}{2}+\sum_{k=1}^{\infty}[a_k(\cos k\mu t+i \sin k\mu t)\right.\\ &\qquad\left.-ib_k(\cos k\mu t+i \sin k\mu t)]\right\}\\ &=\exp\left\{\frac{\beta_0}{2}+\sum_{k=1}^{\infty}\beta_k e^{ik\mu t}\right\}\\ &=\sum_{k=0}^{\infty}\lambda_k e^{ik\mu t}\end{aligned} \qquad (12)$$

Thus $\lambda(t)$ admits of a Fourier expansion for which the coefficients $\lambda_{-k}$ are all zero. Then $$\alpha(t) \cos [\omega t+\phi(t)]=Re\sum_{k=0}^{\infty}\lambda_k e^{i(\omega+k\mu)t} \qquad (13)$$

expresses the hybrid wave in its spectral form. The complex number $\lambda_k$ gives the amplitude and phase of the $k$th sideband components. The right hand side contains spectral components only at frequencies $(\omega+k\mu)$ for non-negative $k$. Thus, the resulting signal contains components at and above carrier only and is an upper sideband signal, the lower sideband being suppressed since the $\lambda_{-k}$ are zero. It is necessary only to show in addition that $\lambda_k$ vanishes also for $k>N$ to prove that the spectral width of the hybrid wave is no greater than the bandwidth of the intelligence $\alpha^2(t)$.

From Equation 12 we can write $$|\lambda(t)|^2=\sum_{m=0}^{\infty}\bar{\lambda}_m\sum_{n=0}^{\infty}\lambda_n e^{i(n-m)\mu t} \qquad (14)$$

where $\bar{\lambda}_m$ denotes the complex conjugate of $\lambda_m$. Simple manipulation of the double sum yields $$|\lambda(t)|^2=\sum_{k=-\infty}^{\infty}\left(\sum_{m=0}^{\infty}\bar{\lambda}_m\lambda_{m+k}\right)e^{ik\mu t} \qquad (15)$$

But $|\lambda(t)|^2=\alpha^2(t)$, hence equating coefficients in Equations 7 and 15

$$\alpha_k=\sum_{m=0}^{\infty}\bar{\lambda}_m\lambda_{m+k} \qquad (16)$$

Now since the $\alpha_k$ must be zero for all $k>N$, it follows from Equation 16 that the $\lambda_k$ must also vanish for $k>N$. Thus, spectral components in the hybrid wave are zero below carrier, and above carrier plus $N\mu$. A lower sideband signal can be produced by advancing the phase of all Fourier constituents in $\log \alpha(t)$ by 90 degrees. In this case, the phase function is the negative of that of Equation 10.

In order to recover the signal $m(t)$ from the signal generated via terminal 51, a conventional square law envelope detector is used at the receiver to yield $\alpha^2(t)$, which is tantamount to the recovery of the original signal $m(t)$. For voice transmission, the invention can be used compatibly with standard double sideband AM receivers. The common practice in such receivers is to use a linear envelope detector rather than square law. Thus, a conventional AM receiver will detect $\alpha(t)$ rather than the intelligence $\alpha^2(t)$. However, the subjective effect is identical to the passing of a voice signal through a square rooter which represents negligible loss of intelligibility. It is quite common in voice systems to employ $n$th rooting of a voice signal in order to gain a compression of the peak-to-root-mean-square ratio for increasing the average power level of the transmitted intelligence. A square rooter is the first approximation to such a device, and the distortion is slight compared to the amount tolerable.

In describing the operation of the embodiments of the invention given in FIGURES 1 and 6, reference has been made to the use of a wide-band 90 degree phase-shift network. According to the invention, a wide-band 90 degree phase-shift and/or phase splitting network constructed as shown in FIGURE 8 may be used. In general, phase-splitting networks previously known provide for a constant amplitude response and an approximated phase difference over the bandwidth of an input signal. The use of such networks involves problems of phase distortion. Since the human ear is relatively insensitive to phase distortion, such networks have been used in voice single-sideband transmission systems. However, in the case of video transmission systems, data transmission systems, and so on, phase distortion is a critical factor, greatly reducing the practicability of using such networks to enable the use of single sideband transmission in these systems.

FIGURE 8 discloses a wide-band 90-degree phase-shift or phase splitting network which differs basically from known networks in that it provides a constant or exact phase difference and an approximated amplitude response over the bandwidth of the input signal. The invention accomplishes a 90-degree phase difference without phase distortion and without the use of modulation techniques, and so on, as used in prior networks. An output signal is produced whose Fourier components differ from a delayed replica of the input signal by 90 degrees throughout the frequency band of the input signal. The invention is particularly suited to television signals or other bandlimited signals in which preservation of the exact waveform is important to convey the intelligence.

The network of this invention depends for its operation on the bandlimitedness of the input signal. If a signal $S(t)$ is limited to frequencies below W cycles per second, the sampling theorem states that the signal $S(t)$ is completely specified for all time by giving its values at sampling instants spaced 1/2W seconds apart. If $S_k$ is the sampled value at the $k$th sampling instant, then $$S(t)=\sum_{k=-\infty}^{\infty}S_k\frac{\sin 2\pi W\left(t-\frac{k}{2W}\right)}{2\pi W\left(t-\frac{k}{2W}\right)} \qquad (17)$$

If we denote by Q($t$) the signal in quadrature with S($t$) (that signal whose Fourier constituents are of equal amplitude with those of S($t$) but with phases shifted by −90 degrees), it can be shown that Q($t$) is the so-called Hilbert Transform of S($t$), as described in "Theory of Fourier Integrals," by E. C. Titchmarsh, published by Oxford University Press, 1937, page 119. The signal Q($t$) may be expressed as $$Q(t)=\frac{1}{\pi}\int_{-\infty}^{\infty}S(t-\tau)-S(t+\tau)d\tau \qquad (18)$$

Straightforward calculation from Equations 17 and 18 yields $$Q(t)=\sum_{k=-\infty}^{\infty}\left\{\sum_{m=-\infty}^{\infty}\left(\frac{S_{k-2m+1}}{\frac{2m-1}{2}\pi}\right)\right\}\frac{\sin 2\pi W\left(t-\frac{k}{2W}\right)}{2\pi W\left(t-\frac{k}{2W}\right)} \qquad (19)$$

where $m$ is a dummy index of summation. The sampled values $Q_k$ of the desired output signal are thus $$Q_k=\sum_{m=-\infty}^{\infty}\left(\frac{S_{k-2m+1}}{\frac{2m-1}{2}\pi}\right) \qquad (20)$$

expressed in terms of the past, present and future values of the samples $S_k$ of S($t$). Since Q($t$) depends on the future values of S($t$), an ideal 90-degree phase-shifting network is not physically realizable. However, at the expense of a small time delay, a very good approximation can be achieved.

As shown in FIGURE 8, for an $n$th order approximation, a delay line with $(2n-1)$ taps is provided. The delay line may be constructed of lumped elements, inductance-capacitance sections or in any known manner, and is terminated at both ends by resistors 55, 56 in its characteristic impedance. The taps are spaced at delays of 1/W seconds, where W is the upper limit, in cycles-per-second, of the input intelligence signal applied to input terminal 57. An additional tap is provided at the center of the delay line for deriving a delayed replica of the input signal to the delay line at terminal 76, providing a divided delay line section 60, 61 at the center of the delay line as shown. Upon an input signal being applied to the terminal 57, the signals at the taps between delay line sections 58, 59 and 60 ahead of the center tap represent the future samples of the delayed input signal at terminal 76. The signals at the taps between delay line sections 61, 62 and 63 which are located between the center tap and the termination represent past samples.

A first group of attenuators 64, 65, 66 and 67 which may be in the form of resistors or any known attenuating device are connected individually to the taps between delay line sections 58, 59 and 60. As shown, the signals appearing at the future history taps are attenuated by factors $2/(2n-1)\pi$, where $n$ is an integer corresponding to the particular tap position away from the center tap. A second group of attenuators 68, 69, 70 and 71 each similar in value and in construction to a corresponding one of the first group of attenuators 64, 65, 66 and 67 are individually connected to the past history taps between the delay line sections 61, 62 and 63. That is, the signals appearing at the past history taps are attenuated by the same factor as are the signals at the future history taps. A certain amount of attenuation may occur in the delay line. The values of the attenuators 64 through 71 can be adjusted slightly from their computed values with respect to the amplitude of the signal at terminal 76 to compensate for the attenuation of the delay line.

The outputs of the first group of attenuators 64, 65, 66 and 67 are applied to an adder 72 which may be a single resistor common to the output circuits of the attenuators 64, 65, 66 and 67 or a vacuum tube adder, and so on. The outputs of the second group of attenuators 68, 69, 70 and 71 are fed to a further adder 73 which functions to total or add the outputs and to feed the resulting signal to a phase inverter 74. The adder 73 may also include a single resistor common to the output circuits of the attenuators 68, 69, 70 and 71 or some other known adding device. The output of the inverter 74 is fed to the adder 72. The adder 72 functions to add the attenuated outputs of the first group of attenuators 64, 65, 66 and 67 with the attenuated outputs from the second group of attenuators 68, 69, 70 and 71 applied to the adder 72 from the inverter 74. The attenuated signals are combined in the adder 72 to produce a quadrature output signal at output terminal 75. The attenuated output of attenuator 67 is offset by the inverted attenuated output of attenuator 68, and so on. The combination of the attenuated tapped signals in adder 72 effects a linear combination of the values at all the taps of the delay line, resulting in the production of a signal at terminal 75 exactly 90 degrees out-of-phase with the delayed replica of the input signal appearing at output terminal 76 connected to the center tap.

In the construction of the phase-shift network of the invention, the values of the attenuators 64 through 71 are determined so as to give the desired amplitude response over the bandwidth of the input signal. On the basis of Equation 20, values have been computed and are shown in FIGURE 8 for each attenuator 64 through 71 to produce the flattest possible amplitude response over the broadest bandwidth. That is, the output amplitude of the network at terminal 75 is equal to the amplitude of the input for all frequencies in the bandwidth of the input signal. The voltage transfer function from the delayed input signal at terminal 76 to the quadrature output signal at terminal 75 may be given by the expression $$H(\omega)=e^{\frac{\pi}{i2}}\frac{4}{\pi}\sum_{k-1}^{n+1}\frac{1}{2k-1}\sin(2k-1)\frac{\omega}{2\pi W} \qquad (21)$$

where the first factor $$e^{\frac{\pi}{i2}}$$

corresponds to the 90 degree phase shift of all frequencies and the second factor corresponds to the magnitude of the transfer function. The magnitude of H($\omega$) is plotted for various values of $n$ in the curve of FIGURE 10, with the attenuators 64 through 71 having the values indicated in FIGURE 8. The dashed line indicates the swing of the signal around the value of amplitude equal to one for various values of $n$, where $n$ is the order of the complexity of the network as determined by the number of delay line sections. The irregularly dashed line indicates the 90-degree phase change of the signal at all values of $n$, and so on. As shown in the curve, for larger values of $n$, hence a longer delay line, the magnitude converges to unity over the pass band. The phase shift is maintained at 90 degrees throughout the pass band for all orders of approximation. The values of the attenuators 64 through 71 are set in the example given so that, as shown in FIGURE 10, a certain amount of flatness at the ends of the curve is sacrificed to provide maximum bandwidth. For example, attenuators 67, 68 are adjusted so that the amplitude of the signal at their output is $2/\pi$ times the amplitude of the signal at terminal 76, attenuators 66, 69 are adjusted so that their outputs are $2/3\pi$ times the amplitude of the signal at terminal 76, and so on. The values of the attenuators 64 through 71 can be adjusted in relation to one another such that the bandwidth is reduced, providing a flatter over all amplitude response, if desired. By adjusting the values of the attenuators 64 through 71, a desired amplitude response over the bandwidth of the incoming signal can be obtained.

As the attenuations of the signals at the past history taps of the delay line are equal to the attenuations of the signals at the future history taps, a modified version of the phase-shift network is possible as shown in FIGURE 9. The tapped delay line is half its original length as shown in FIGURE 8, and is shorted at its end. Since a shorted delay line reflects a backward travelling wave at inverted polarity, the past history values are subtracted linearly at the future history taps between delay line sections 58, 59 and 60. A quadrature output signal is still produced at the output terminal 75 in response to an input signal applied to terminal 57 by a linear combination of the signals at the future history taps. A delayed replica of the input signal may be obtained by applying the input signal over an electrical path including resistor 80, a delay line 81, load resistor 82 and output terminal 83. Delay line 81 is set to delay the input signal by a duration sufficient to compensate the delay necessitated in obtaining the quadrature signal at terminal 75. By this action, a signal is produced at terminal 75 90-degrees out-of-phase with the signal at terminal 83, the signal at terminal 83 being an exact, delayed replica of the signal applied to input terminal 57.

The phase-shift network shown in FIGURES 8 and 9 is readily adaptable for use in a wide range of applications. It can be used in any application where it is desired to provide a signal of a 90-degree phase difference throughout the frequency band of a given input signal. As such, the network can be used in the generation of single sideband or vestigial-sideband modulated carriers. It is particularly suited to video and other band-limited signals in which preservation of the exact waveform is important to convey the intelligence. This is possible since the network provides both a quadrature output signal and a delayed replica of the input signal without phase distortion.

A further embodiment of the network shown in FIGURE 9 is indicated by the dotted lines. As shown, the delay line may be terminated through a small resistor 92 having a value, for example, equal to .001 times the characteristic impedance of the line. A delayed replica of the input signal is taken from across the resistor 92 via an output terminal 93. The path including resistor 80, delay line 81, resistor 82 and terminal 83 is not needed and is eliminated. By making the resistor 92 of a small value, the delay line is for all practical purposes short circuited, permitting the proper reflection of energy back along the delay line.

In adapting the phase-shift network given in FIGURES 8 and 9 for use in the embodiment of the invention given in FIGURE 1, the output of the non-linear device 13, log $\alpha(t)$ is applied to the input terminal 57 of the network. The output signal $\phi(t)$ in quadrature with a delay replica of log $\alpha(t)$ is fed from output terminal 75 of the network and through a suitable phase inverter device, represented by switch 26 in FIGURE 1, to the phase modulator 22. By the selective operation of the switch 26, either upper sideband ($-90°$) or lower sideband ($+90°$) operations can be selected. In certain applications, it may be desirable to employ the phase-splitting characteristic of the network. In such a case, the non-negative signal $\alpha(t)$ is converted to the signal log $\alpha(t)$ by non-linear device 13 and fed directly and solely to the input terminal 57 of the phase-shift network given in FIGURE 8 or 9. The quadrature output signal is applied from output terminal 75 of the network through switch 26 to the phase modulator 22.

The delayed replica of the input signal log $\alpha(t)$ is fed from terminal 76 of the arrangement given in FIGURE 8 or from the terminal 83 of the arrangement given in FIGURE 9 to the amplitude modulator 25 through a zero-memory non-linear device having an exponential transfer characteristic of the form $y=\exp x$, where $y$ is the output voltage for an input voltage $x$. Since the input to the non-linear device is the logarithm of the function $\alpha(t)$ and since this device has an exponential transfer characteristic, the output of the device is the function itself; that is, the desired envelope input signal $\alpha(t')$ to the amplitude modulator 25. The signal $\alpha(t')$ is guaranteed to be non-negative by the exponential transfer characteristic of the device. Since the delay to compensate for the delay in producing the quadrature signal $\phi(t)$ is performed within the phase-shift network, the delay circuit 24 shown in FIGURE 1 is eliminated.

An example of a nonlinear, exponential device that could be used in the application just described is given in FIGURE 5. The delayed signal log $\alpha(t')$ is applied from the phase-splitting network to one input of a combiner (specifically, a subtractor) network 85 via input terminal 86. The output of the subtractor 85 is fed to the input of a high-gain amplifier 87 whose output provides the envelope signal $\alpha(t)$. The signal $\alpha(t)$ is fed via output terminal 88 to the amplitude modulator 25 shown in FIGURE 1. In order to make the output of amplifier 87 equal to the exponential of the input signal fed to subtractor 85, a feedback circuit is provided from the output of amplifier 87 back to a second input of the subtractor network 85. The feedback circuit includes a triode tube 89 connected to act as a logarithmic amplifier. The feedback circuit, thus, provides an output equal to the logarithm of the input. It can be shown that, with the logarithmic amplifier 89 in the feedback loop as described, the output of amplifier 87 is a very close approximation to the exponential of the input to the subtractor 85, providing the gain of the amplifier 87 is much greater than unity.

In adapting the network as shown in FIGURE 8 or 9 to the embodiment given in FIGURE 6, the output of the non-linear device 41, log $\alpha^2(t)$, is applied to the input terminal 57. The quadrature output signal is fed from the output terminal 75 to the phase modulator 43 through the phase inverting switch 50. FIGURE 7 shows a modification of the embodiment given in FIGURE 6 in order to utilize the phase-splitting characteristics of the network. The non-negative input signal $\alpha^2(t)$ is fed through the non-linear device 95 similar to the non-linear device 41 shown in FIGURE 6 and, for example, of the type shown in FIGURE 4, producing an output signal log $\alpha^2(t)$. The signal log $\alpha^2(t)$ is fed to the input terminal 57 of the wide-band 90-degree phase-splitting network 96 as shown in FIGURE 8 or 9. The quadrature output signal $\phi(t)$ is fed from the output terminal 75 of the network employed to the phase modulator 97. While not shown, it is clear that a phase inverter may be inserted in the output of the phase-splitter 96 to provide for the selection of upper or lower sideband operation. A carrier supplied by carrier generator 98 is modulated by the signal $\phi(t)$ in the phase modulator 97 and fed to the amplitude modulator 99.

Simultaneously, with the above action, the delayed replica, log $\alpha^2(t')$ of the signal log $\alpha^2(t)$, is fed from output terminal 76 of the network given in FIGURE 8 or from the output terminal 83 of the network given in FIGURE 9 to an attenuator 100. The anttenuator 100 is set to multiply (reduce the gain of) the input signal log $\alpha^2(t')$ by one-half, producing an output signal log $\alpha(t')$. The signal log $\alpha(t')$ is fed through a non-linear, exponential device 101 which is the inverse of the device 95 and may be of the type shown in FIGURE 5. The output signal $\alpha(t)$ from the device 101, the desired envelope, modulates the phase modulated carrier in the amplitude modulator 99. A hybrid amplitude and phase modulated signal appears at output terminal 102 having signal energy on only one side of the carrier, the intelligence being conveyed in the square of the envelope.

The operation of the arrangement of FIGURE 7 is similar to that of the embodiment given in FIGURE 6, and the mathematical proofs advanced in connection with FIGURE 6 also apply to the arrangement in FIGURE 7. The spectral width for the modulated signal at terminal 102 is equal to the bandwidth of the intelligence, and distortionless detection is accomplished at a receiver by a square-law envelope detector.

What is claimed is:

A phase-shift network comprising a delay line terminated at one end in its characteristic impedance and effectively shorted at its other end through a single resistor connected to a point of reference potential and having a resistance value small with respect to said characteristic impedance, a plurality of taps spaced at delays of 1/W seconds along said delay line with the tap nearest said shorted end spaced 1/2W seconds from said shorted end where W is the upper limit in cycles-per-second of an input signal applied to said one end of said delay line, a plurality of attenuators individually connected to said taps, said attenuators being arranged to cause the attenuation effected by said attenuators to decrease along said delay line, the largest amount of attenuation being effected by the attenuator connected to said tap nearest said one end and the smallest amount of attenuation being effected by the attenuator connected to said tap nearest said shorted end, an output terminal connected to the junction of said resistor and said delay line for deriving from across said resistor an output signal which is a delayed replica of said input signal, an adder connected to said attenuators for adding the outputs of said attenuators to produce a second output signal in phase-quadrature with said first output signal, the value of said attenuators being determined to give the desired amplitude response in said second output signal over the bandwidth of said input signal.

References Cited in the file of this patent

UNITED STATES PATENTS

| | | |
|---|---|---|
| 2,124,599 | Wiener et al. | July 26, 1938 |
| 2,227,906 | Kellogg | Jan. 7, 1941 |
| 2,666,181 | Courtillot | Jan. 12, 1954 |
| 2,680,151 | Boothroyd | June 1, 1954 |
| 2,711,516 | Fredendall | June 21, 1955 |
| 1,743,367 | Felch et al. | Apr. 24, 1956 |
| 2,755,381 | Woodcock | July 17, 1956 |
| 2,759,044 | Oliver | Aug. 14, 1956 |
| 2,760,164 | Graham et al. | Aug. 21, 1956 |
| 2,790,956 | Ketchledge | Apr. 30, 1957 |
| 2,922,965 | Harrison | Jan. 26, 1960 |

FOREIGN PATENTS

| | | |
|---|---|---|
| 161,647 | Australia | Mar. 3, 1955 |